(12) United States Patent
Persells

(10) Patent No.: US 10,486,886 B2
(45) Date of Patent: Nov. 26, 2019

(54) PATTERNED DUAL SUSCEPTOR

(71) Applicant: SFC Global Supply Chain, Inc., Marshall, MN (US)

(72) Inventor: James Persells, Marshall, MN (US)

(73) Assignee: SFC Global Supply Chain, Inc., Marshall, MN (US)

( * ) Notice: Subject to any disclaimer, the term of this patent is extended or adjusted under 35 U.S.C. 154(b) by 627 days.

(21) Appl. No.: 15/094,670

(22) Filed: Apr. 8, 2016

(65) Prior Publication Data

US 2016/0221743 A1    Aug. 4, 2016

Related U.S. Application Data

(62) Division of application No. 13/781,168, filed on Feb. 28, 2013, now Pat. No. 9,334,100.

(Continued)

(51) Int. Cl.
*H05B 6/80* (2006.01)
*B65D 81/34* (2006.01)
(Continued)

(52) U.S. Cl.
CPC ............ *B65D 81/3453* (2013.01); *A23L 5/15* (2016.08); *B65D 75/02* (2013.01);
(Continued)

(58) Field of Classification Search
CPC ................ B65D 81/3453; B65D 75/02; B65D 81/3446; B65D 2581/3441;
(Continued)

(56) References Cited

U.S. PATENT DOCUMENTS 5,180,894 A    1/1993 Quick et al.
5,227,599 A    7/1993 Mason et al.
(Continued)

FOREIGN PATENT DOCUMENTS

CA    2069432 A1    5/1991
CA    111700          4/2007
(Continued)

OTHER PUBLICATIONS

International Search Report and Written Opinion for PCT/US2013/050833 dated Oct. 7, 2013.
(Continued)

*Primary Examiner* — Quang T Van
(74) *Attorney, Agent, or Firm* — Merchant & Gould P.C.

(57) ABSTRACT

A microwave packaging material including a plurality of susceptors is disclosed. Each susceptor includes a plastic film or polymer with a metal layer on one surface of the plastic film and a paper adhered to the plastic film opposite the metal layer. A patterned adhesive is bonded between a first susceptor layer and a second susceptor layer in a pattern bond creating sealed air pockets. A paper board substrate is adhered using an adhesive in a bond pattern to one of the susceptor layers facing the metal of the respective susceptor layer to provide the microwave packing material rigidity. Upon exposure to microwave energy in a microwave oven, moisture is trapped between the paper board substrate and the susceptor layer creating a vapor pressure that causes the sealed air pockets to form expanded air pockets.

8 Claims, 6 Drawing Sheets

Related U.S. Application Data

(60) Provisional application No. 61/673,155, filed on Jul. 18, 2012.

(51) Int. Cl.
  *B65D 75/02* (2006.01)
  *A23L 5/10* (2016.01)

(52) U.S. Cl.
  CPC ...... *B65D 81/3446* (2013.01); *A23V 2002/00* (2013.01); *B65D 2581/3412* (2013.01); *B65D 2581/3441* (2013.01); *B65D 2581/3452* (2013.01); *B65D 2581/3497* (2013.01)

(58) Field of Classification Search
  CPC .... B65D 2581/3452; B65D 2581/3412; B65D 2581/3497; A23L 5/15; A23V 2002/00
  USPC ....... 219/730, 725, 727, 728, 729, 731, 732, 219/757, 759; 426/107, 109, 111, 113, 426/127, 531, 234, 241, 243; 428/35.8, 428/156, 34.3, 461
  See application file for complete search history.

(56) References Cited

U.S. PATENT DOCUMENTS

| | | | |
|---|---|---|---|
| 6,137,099 | A | 10/2000 | Hamblin |
| 7,038,182 | B2 | 5/2006 | Young et al. |
| D545,125 | S | 6/2007 | Dodge et al. |
| 7,414,230 | B2 | 8/2008 | Fitzwater |
| 7,514,659 | B2 | 4/2009 | Lafferty |
| 7,923,669 | B2 | 4/2011 | Wnek et al. |
| 8,013,280 | B2 | 9/2011 | Robison et al. |
| 8,061,265 | B2 | 11/2011 | Cambay |
| 8,063,344 | B2 | 11/2011 | Cole et al. |
| 8,198,571 | B2 | 6/2012 | Cole et al. |
| 8,309,896 | B2 | 11/2012 | Fitzwater |
| 8,658,952 | B2 | 2/2014 | Lafferty |
| D744,851 | S | 12/2015 | Monforton et al. |
| 9,334,100 | B2 | 5/2016 | Persells |
| 2003/0206997 | A1 | 11/2003 | Winkelman et al. |
| 2004/0023000 | A1 | 2/2004 | Young et al. |
| 2006/0096978 | A1 | 5/2006 | Lafferty et al. |
| 2006/0289519 | A1 | 12/2006 | Sharp |
| 2007/0251943 | A1* | 11/2007 | Wnek ................ B65D 81/3446 219/730 |
| 2008/0023469 | A1 | 1/2008 | Fitzwater |
| 2008/0081095 | A1* | 4/2008 | Cole ...................... B65D 65/14 426/107 |
| 2008/0087664 | A1 | 4/2008 | Robison et al. |
| 2009/0050520 | A1 | 2/2009 | Cambay |
| 2011/0147377 | A1 | 6/2011 | Wnek et al. |
| 2012/0091126 | A1 | 4/2012 | Fitzwater |
| 2013/0313251 | A1 | 11/2013 | Bamoud et al. |
| 2017/0349355 | A1 | 12/2017 | Crooks et al. |

FOREIGN PATENT DOCUMENTS

| | | |
|---|---|---|
| EP | 1 886 926 A1 | 2/2008 |
| EP | 1 480 879 B1 | 9/2010 |
| GB | 1018519 | 1/2011 |
| JP | 11-91796 | 4/1999 |
| WO | 2005/056387 A1 | 6/2005 |
| WO | 2007/043087 A2 | 4/2007 |
| WO | 2007/146637 A2 | 12/2007 |
| WO | 2008/066540 A1 | 6/2008 |
| WO | 2008/132216 A1 | 11/2008 |

OTHER PUBLICATIONS

Bardenstein et al.,"Packaging for Controlling Texture of Frozen Microwaveable Sandwiches," 19th IAPRI World Conference on Packaging 2014: Responsible Packaging for a Global Market, 1 page (Jun. 15, 2014).

Martine et al., "Microwaveable Packaging for Heating and Crisping a Food Product," 19th IAPRI World Conference on Packaging 2014: Responsible Packaging for a Global Market, 2 pages (Jun. 15, 2014).

Microwave Susceptor Film, http://midwestlaminating.com/?page_id=563, Midwest Laminating & Coatings, Inc., 1 page (Copyright 2019).

Sandwich Packaging, https://web.archive.org/web/20120126163617/ http://www.bcpflute.com/food-to-go/sandwich-packaging/, BCP Fluted Packaging Ltd., 1 page (Jan. 26, 2012).

\* cited by examiner

PATTERNED DUAL SUSCEPTOR

PATTERNED DUAL SUSCEPTOR

This application is a divisional of U.S. application Ser. No. 13/781,168, filed Feb. 28, 2013, now U.S. Pat. No. 9,334,100, issued May 10, 2016, which claims priority to U.S. Application Ser. No. 61/673,155 filed Jul. 18, 2012, both of which are hereby incorporated by reference in their entirety.

BACKGROUND

Microwave materials of various sorts are commonly used to influence the cooking effect of microwave energy on food products. These microwave materials may be paper, paperboard, or plastics with a metal foil or a metal deposit. The metal foils and metal deposits are known as interactive materials that provide enhanced surface heating, microwave shielding, and energy distribution functions. The microwave materials are mostly arranged and configured for a particular food product or type of food product.

Some microwave materials use susceptor technology. However, for optimal performance of the susceptors, the placement of the susceptor with respect to the food is important. If the susceptor is separated from the food product by a gap, the ability of the susceptor to heat the food product is diminished because the susceptor is not in contact with the food product and cannot brown or crisp the food product. Furthermore, poor microwave cooking often results in soggy food products which are less appealing to the consumer.

Accordingly, there is a need for alternative microwave packaging materials to provide improved performance of susceptors that are arranged and configured to contact a food product.

SUMMARY

The present invention provides for enhanced microwave cooking of a food product. More specifically, in embodiments constructed in accordance with the invention, the performance of susceptors is improved, thereby leading to browned and crisped food products that are appealing to consumers. In one preferred embodiment described herein, a microwave packaging material is constructed with several structural layers to cook a food product. The embodiment described herein is in connection with an egg roll. However, the embodiments might also employ the principles of the present invention.

According to an embodiment of the present invention, the microwave packaging material includes two susceptors and a paper board. Each susceptor includes a plastic film or polymer, preferably polyester, with a metal layer on one surface of the plastic film and a paper adhered to the plastic film opposite the metal layer. A patterned adhesive is laminated between the susceptors against each paper of the plastic films. The paper board is adhered to one of the plastic films adjacent to the metal layer to provide rigidity and insulation. The paper may include a small amount of water that generates moisture in the form of steam that escapes when cooking in the microwave, which helps to minimize the food from becoming soggy. The arrangement and configuration of the microwave packaging material enhances microwave cooking of food products by achieving increased browning and crisping thereby eliminating the possibility of having a soggy food product.

More specifically, related to the embodiment just described, the microwave packaging material is formed by applying a first metal foil or a first thin metal deposit to a first plastic film. A first paper substrate is adhered using an adhesive to the first plastic film opposite the metal side of the first plastic film to form a first susceptor layer. A second susceptor layer is formed the same way, that is, by applying a second metal foil or a second thin metal deposit to a second plastic film and using an adhesive to adhere a second paper substrate to the second plastic film opposite the metal side of the second plastic film. A patterned adhesive is bonded between the first susceptor layer and the second susceptor layer in a pattern bond creating sealed air pockets. A paper board substrate is adhered using an adhesive in a bond pattern to one of the susceptor layers facing the metal of the respective susceptor layer to provide rigidity. Upon exposure to microwave energy in a microwave oven, moisture is trapped between the paper board substrate and the second susceptor layer creating a pressure that causes the sealed air pockets to form expanded air pockets.

The paper board substrate is about 12.3 pt paper and contains cuts that are about 50% penetrated through the paper board. The cuts in the paper board substrate are about 0.25 inches wide. The cuts are horizontally spaced about 0.125 inches apart and vertically spaced about 0.333 inches apart. There are about 120 cuts in a microwave packaging material. The paper board substrate provides rigidity to the microwave packaging material and helps support the food product.

In another embodiment, the thin metal deposit may be formed by depositing a thin layer of aluminum which is then applied to a sheet of polyester film. The metallized polyester film is bonded to a paper substrate to create a susceptor. A second susceptor may be formed identical to the first susceptor to achieve a microwave packaging material with two susceptors. The paper substrate can be a 25 lb paper substrate or the like. The metallized film can have a thickness of about 48 gauge or the like. The two susceptors are bonded together by a patterned adhesive layer. The patterned adhesive layer is bonded between the two susceptors in a quilt bond pattern creating sealed air pockets. The patterned adhesive layer is applied adjacent to the two paper substrates of the susceptors. It should be appreciated that the patterned adhesive layer may also be applied adjacent to the two metallized polyester film surfaces of the susceptors. A paper board substrate is applied to one of the susceptors in a dot bond pattern to form the microwave packaging material.

The microwave packaging material is wrapped around a food product. When the food product is placed in a microwave for cooking, the sealed air pockets expand to contact surfaces of irregular shaped food products and provide increased contact with the food product. For example, one popular food product having an irregular shape is an egg roll. Although an egg roll will be used as one example of a food product to describe the microwave packaging material in accordance with the principles of the disclosure, it is understood that other food products are suitable.

The egg roll is wrapped with the microwave packaging material folded to form a sleeve. The ends of the egg roll are exposed such that the microwave packaging material does not wrap around them. With the ends of the egg roll uncovered, moisture is allowed to escape during heating. The egg roll can be heated in a many types of microwave ovens. One example is an 1100 watt microwave oven that can heat the egg roll for a maximum of two minutes. It is to be understood that alternative microwave ovens having some higher or lower wattage can be used and as such the heating time of the egg roll can vary. The egg roll is typically heated from a fully cooked frozen state. It is understood that the time and temperature may also vary depending on the type of food being wrapped in the microwave packaging material. When the microwave packaging material is exposed to microwave energy, the sealed air pockets form expanded air pockets that contact the surface of the egg roll. The egg roll is heated and increased browning and crisping is achieved as a result of the expanded air pockets contacting the egg roll. It should be appreciated that the amount of contact may be varied by choosing air pocket dimensions of higher or lower size.

As seen in an embodiment of the present invention, the microwave packaging material is folded over and two opposing ends of the microwave packaging material are brought into contact with one another. The two opposing ends each include a slit and a tab. The slit and tab are complementary for interlocking the two opposing ends together. The tabs can have a radius of about 0.375 inches. The microwave packaging material is arranged and configured to form a sleeve around the egg roll. When the microwave packaging material is exposed to microwave energy, the sealed air pockets expand to contact the irregular surface of the egg roll and provide increased browning and crisping.

The size and shape of the air pockets may vary according to the food product being used. The pattern of bond lines forming the sealed air pockets of the patterned adhesive layer generally defines an array of shapes. Such shapes may be, for example, circles, ovals, other curvilinear shapes, preferably symmetrical, triangles, squares, rectangles, hexagons, and other polygons, including right polygons and equilateral polygons. The shapes in the array are preferably nested with adjacent shapes in the array in a tile-like pattern. The pattern of bond lines may be formed by the application of the patterned adhesive layer on the paper substrate side of the first susceptor to bond the first susceptor with the second susceptor on the paper substrate side of the second susceptor. It should be appreciated that the pattern of bond lines may be formed by the application of the patterned adhesive layer on the metallized polyester side of the first susceptor to bond the first susceptor with the second susceptor on the metallized polyester side of the second susceptor.

Generally, the size of the air pockets is from about ⅓ inch to about ¾ inch. In embodiment, the sealed air pockets are arranged and configured to be about ½ square inches in size. The sealed air pockets typically have about ⅛ inch to about ½ inch space between the sealed air pockets. This spacing between the air pockets prevents tearing of the air pockets from the substrate when forming expanded air pockets.

The microwave packaging material can include perforated edges that connect it to another microwave packaging material. One microwave packaging material can be separated from another microwave packing material by tearing along the perforated edge. The perforations are cut about 0.125 square inches. The size of each microwave packing material can be selected dependent upon the size of the food product. In an embodiment, the size of each microwave packaging material is about 4.106 inches to about 4.138 inches in width and the height of each microwave packaging material is about 5.218 inches measured from the two opposing tabs.

This summary is provided to introduce a selection of concepts in a simplified form that is further described below in the Detailed Description. This summary is not intended to identify and/or specify key or essential features of the claimed subject matter, nor is it intended to limit the scope of the claimed subject matter.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure increases the browning and crisping of food products to improve microwave cooked food while maintaining good food quality. Certain types of susceptor materials utilize microwave electromagnetic energy to generate heat at a surface. One downside with conventional susceptor materials is that most of the heat is lost to surrounding air or the microwave oven floor. The present invention discloses a microwave packaging material that aims to direct the heat to the food product for improved browning and crisping results.

Furthermore, the microwave packaging material helps retain the right amount of moisture to cook the food product effectively and maintain the flavor and texture. The result leads to a food product that is brown and crisp rather than being soggy or unevenly cooked with hard edges. Typical consumer complaints have resulted from using paper towels or other cloth materials that do a poor job of cooking microwavable foods. The food product is typically rubber like, soggy, and/or unevenly cooked.

Some examples of typical food products that benefit from susceptor packaging used in the microwave are baked dough foods, crusted pies, sandwiches, pizza, processed meats, egg rolls, finger foods and other like items.

Figure 1:
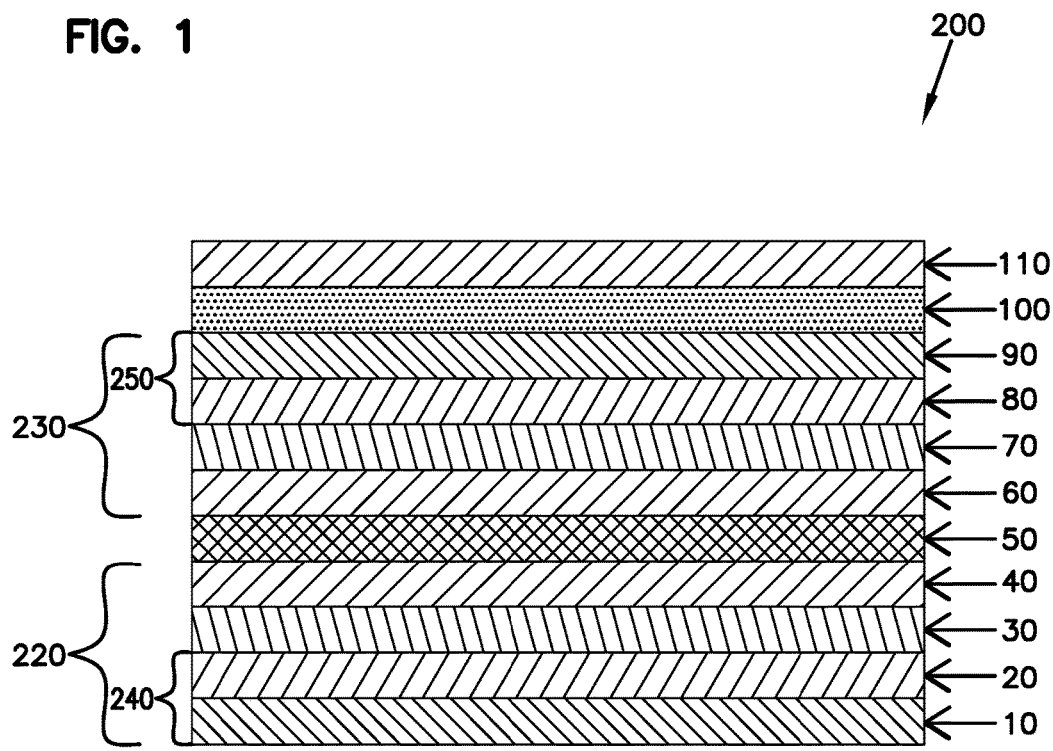
FIG. 1 is a component view of microwave packaging material constructed in accordance with the principles of the present invention.
Figure 2:
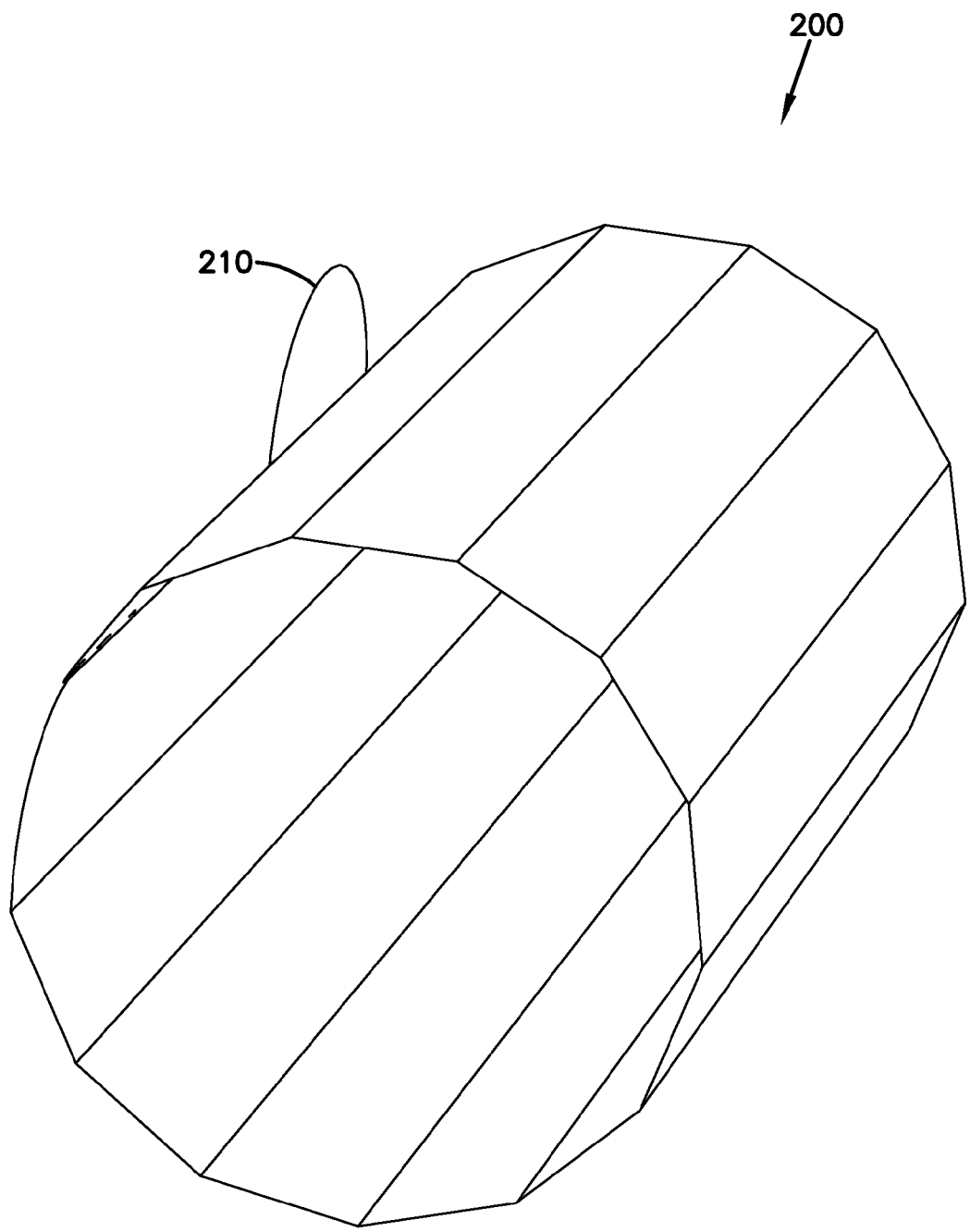
FIG. 2 is a perspective view of the microwave packaging material folded.
Figure 3:
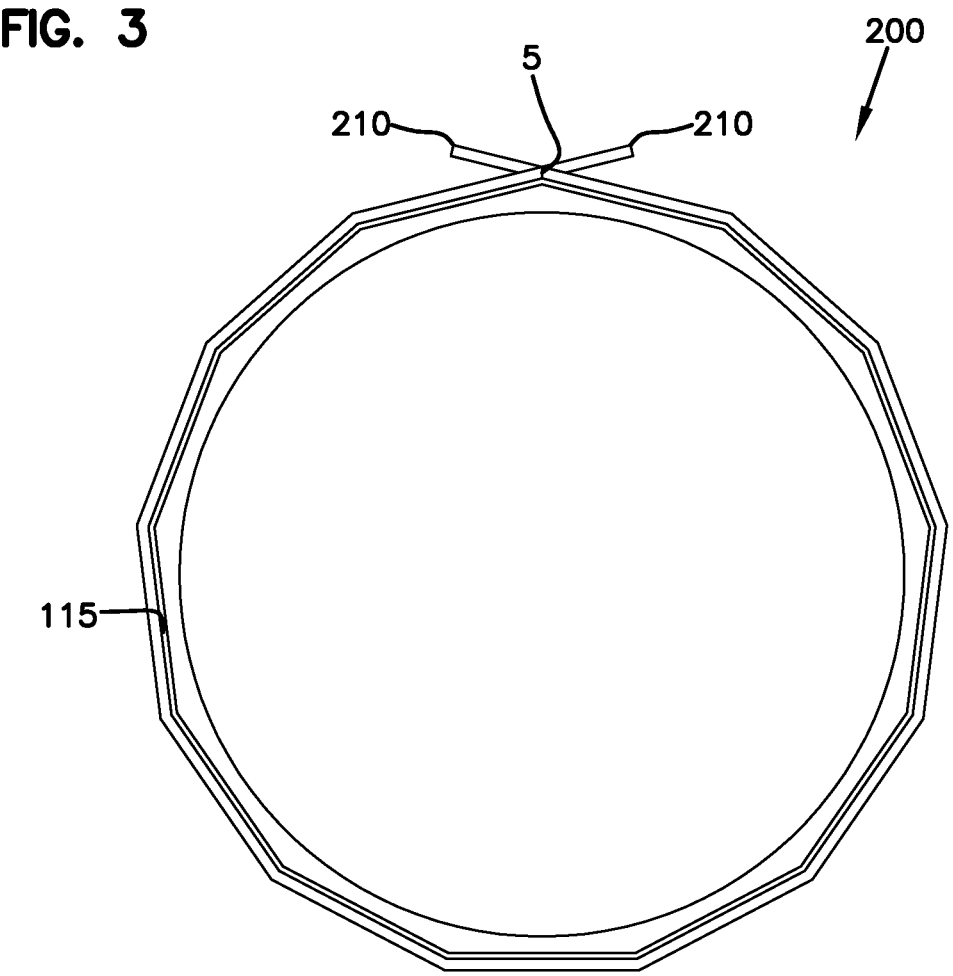
FIG. 3 is a top view of the microwave packaging material of FIG. 2.
Figure 4:
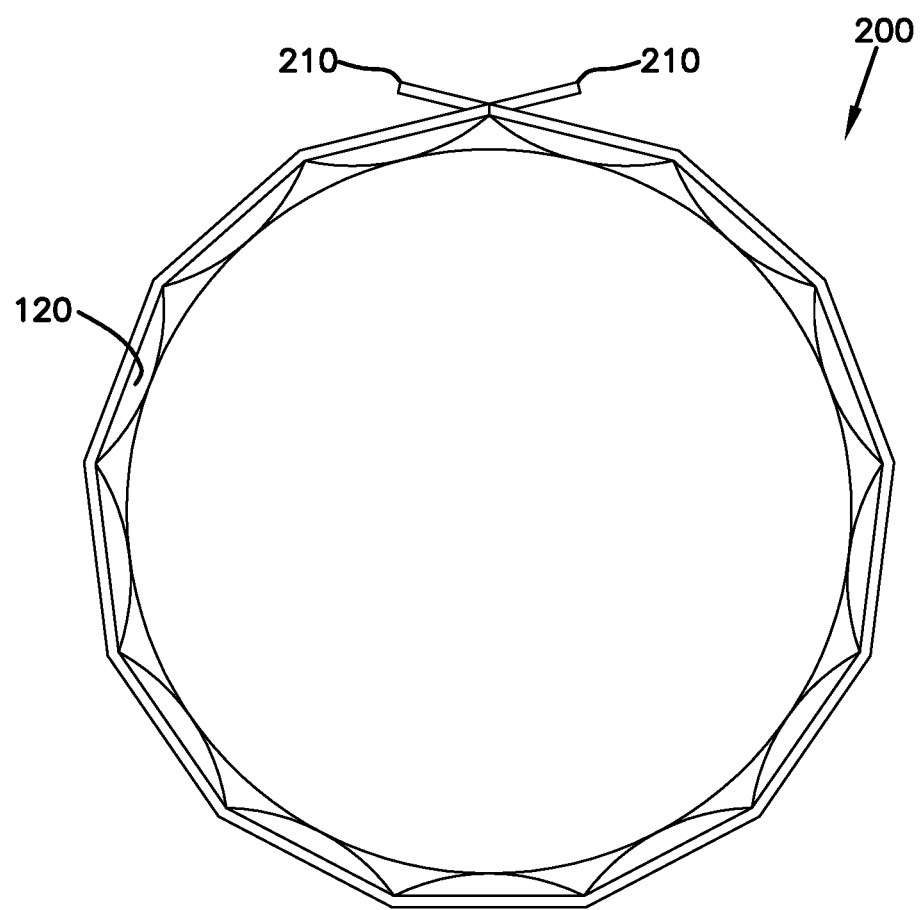
FIG. 4 is a top view of the microwave packaging material with the sealed air pockets expanded.
Figure 5:
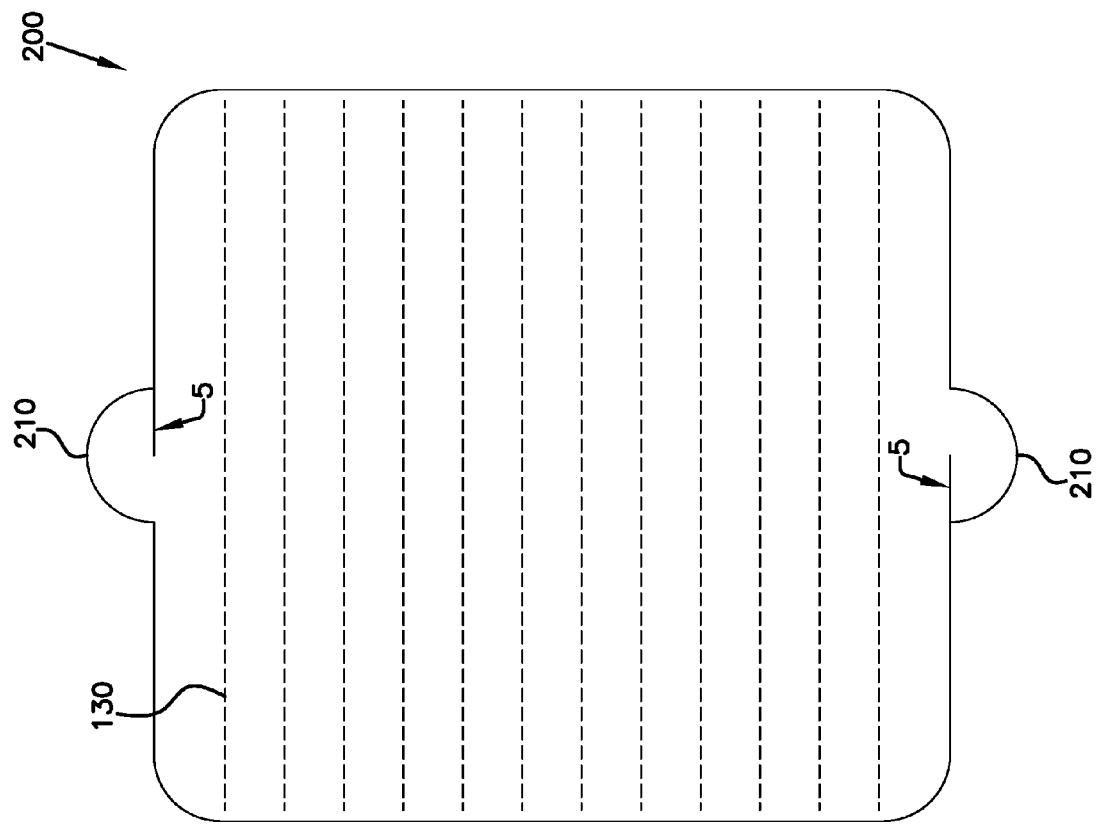
FIG. 5 is a front view of the microwave packaging material as a single unit.

Referring now to FIG. 1, the components of the microwave packaging material is shown. In this configuration, a first plastic film 10 is provided having a first thin metal deposit 20 applied on one side of the first plastic film 10. A first paper substrate 40 is adhered using an adhesive 30 to the first plastic film 10 opposite the first thin metal deposit 20 of the first plastic film 10 to form a first susceptor layer 220. A second susceptor layer 230 is formed the same way, that is, by applying a second thin metal deposit 80 to a second plastic film 90 and adhering a second paper substrate 60 using an adhesive 70 to the second plastic film 90 opposite the second thin metal deposit 80 of the second plastic film 90. A patterned adhesive 50 is bonded between the first susceptor layer 220 and the second susceptor layer 230 in a pattern bond creating sealed air pockets 115. A paper board substrate 110 is adhered to either the first or second susceptor layer 220, 230 using an adhesive 100 in a bond pattern facing a first or second thin metal deposit 20, 80 of the first or second susceptor layer 220, 230 to provide rigidity. Upon exposure to microwave energy in a microwave oven, moisture is trapped between the paper board substrate 110 and the second susceptor layer 230 creating a pressure that causes the sealed air pockets 115 to form expanded air pockets 120.

The first thin metal deposit 20 or the second thin metal deposit 80 may be formed by depositing a thin layer of aluminum which is then applied to the respective plastic film that is preferably made of polyester. A first metallized polyester film 240 is bonded to the first paper substrate 40 to create the first susceptor layer 220. A second metallized polyester film 250 is bonded to the second paper substrate 60 to create the second susceptor layer 230. The metallized polyester films can have a thickness of about 48 gauge or the like. The paper substrate can be a 25 lb paper substrate or the like. The first susceptor layer 220 and the second susceptor layer 230 are identical and make up the dual susceptor component of the microwave packaging material 200. The first susceptor layer 220 and the second susceptor layer 230 are bonded together by a patterned adhesive layer 50. The patterned adhesive layer 50 is bonded adjacent to the two susceptors in a quilt bond pattern creating sealed air pockets 115. A paper board substrate 110 is adhered using an adhesive 100 in a bond pattern to the second susceptor layer 230 and provides rigidity to the microwave packaging material 200.

In another embodiment, the first metallized polyester film 240 is bonded to the first paper substrate 40 to create the first susceptor layer 220. The second metallized polyester film 250 is bonded to the second paper substrate 60 to create the second susceptor layer 230. The first susceptor layer 220 and the second susceptor layer 230 are bonded together by a patterned adhesive layer 50. The patterned adhesive layer 50 is bonded adjacent to the first paper substrate 40 and the second paper substrate 60 in a quilt bond pattern creating sealed air pockets 115. The paper board substrate 110 is adhered using an adhesive 100 in a bond pattern to the second susceptor layer 230 facing the second metallized polyester film 250 and provides rigidity to the microwave packaging material 200.

In another embodiment, the first metallized polyester film 240 is bonded to the first paper substrate 40 to create the first susceptor layer 220. The second metallized polyester film 250 is bonded to the second paper substrate 60 to create the second susceptor layer 230. The first susceptor layer 220 and the second susceptor layer 230 are bonded together by a patterned adhesive layer 50. The patterned adhesive layer 50 is bonded adjacent to the first metallized polyester film 240 and the second metallized polyester film 250 in a quilt bond pattern creating sealed air pockets 115. In this configuration, the patterned adhesive layer 50 is facing the side opposite the paper substrate 40, 60 of the metallized polyester films 240, 250. The paper board substrate 110 is adhered using an adhesive 100 in a bond pattern to the second susceptor layer 230 facing the second paper substrate 60 and provides rigidity to the microwave packaging material 200.

The paper board substrate 110 is applied to the second susceptor layer 230 using an adhesive 100 in a dot bond pattern to form the microwave packaging material 200. The paper board substrate 110 is about 12.3 pt paper and contains cuts 130 that are about 50% penetrated through the paper board substrate 110. The cuts 130 in the paper board substrate 110 are about 0.25 inches wide. The cuts 130 are horizontally spaced about 0.125 inches apart and vertically spaced about 0.333 inches apart. There are approximately one hundred and twenty cuts 130 in the microwave packaging material 200. The paper board substrate 110 provides rigidity to the microwave packaging material 200 and helps contain good contact with the food product.

The size and shape of the seal air pockets 115 may vary according to the food product. The pattern of bond lines forming the sealed air pockets 115 of the patterned adhesive layer 50 generally defines an array of shapes. Such shapes may be, for example, circles, ovals, other curvilinear shapes, preferably symmetrical, triangles, squares, rectangles, hexagons, and other polygons, including right polygons and equilateral polygons. The shapes in the array are preferably nested with adjacent shapes in the array in a tile-like pattern.

The pattern of bond lines may be formed by the application of the patterned adhesive layer 50 between the first paper substrate 40 and the second paper substrate 60 of the respective susceptor layers 220, 230. It should be appreciated that the patterned adhesive layer 50 can bond the first susceptor layer 220 to the second susceptor layer 230 along the side opposite the first paper substrate 40 and the second paper substrate 60. In other words, the patterned adhesive layer 50 can be sandwiched between the film side of the first metallized polyester film 240 and the film side of the second metallized polyester film 250.

Generally, the sealed air pockets 115 are about ⅓ inch to ¾ inch wide. In an embodiment, the sealed air pockets 115 are arranged and configured to be about ½ square inches in size. The sealed air pockets 115 typically have about ⅛ inch to about ½ inch space between them, preferably about ¼ inch space. This spacing between the sealed air pockets 115 prevents tearing of the sealed air pockets 115 from the substrate 40 when forming expanded air pockets 120.

Referring now to FIGS. 2-5, the microwave packaging material 200 is shown folded or wrapped to form a sleeve to insulate or cover a food product. When the food product is placed in the microwave oven, the sealed air pockets 115 form expanded air pockets 120 that provide increased contact with an irregular shaped food product, such as an egg roll. Although an egg roll will be used as one example of a food product to describe the microwave packaging material in accordance with the principles of the disclosure, it is understood that other food products are suitable.

The method of using the microwave packaging material 200 includes folding the microwave packaging material 200 to form a sleeve that provides for a food product to be contained therein. The ends of the egg roll are exposed such that the microwave packaging material 200 does not wrap around them. With the ends of the egg roll uncovered, moisture is allowed to escape during microwave heating to minimize sogginess. The food product is typically fully cooked and heated from a frozen state by the consumer. The egg roll is heated in a typical 1100 watt microwave oven for a maximum of two minutes. It is understood that the temperature and heating times can vary with food types and microwave oven types. When the microwave packaging material 200 is exposed to microwave energy, the sealed air pockets 115 form expanded air pockets 120 that contact the surface of the egg roll. The egg roll is heated and increased browning and crisping is achieved as a result of the expanded air pockets 120 contacting the irregular shaped egg roll. It should be appreciated that the amount of contact may be varied by choosing sealed air pocket 115 dimensions of higher or lower size.

The microwave packaging material 200 is folded over such that two opposing tabs 210 of the microwave packaging material 200 are brought into contact with one another. The two opposing tabs 210 each include a slit 5 that are complementary for interlocking together to form a sleeve. The tabs have a radius of about 0.375 inches. The microwave packaging material 200 is arranged and configured to form the sleeve around the egg roll. When the microwave packaging material 200 is exposed to microwave energy, the sealed air pockets 115 form expanded air pockets 120 that contact the irregular surface of the egg roll and provide increased browning and crisping.

Figure 6:
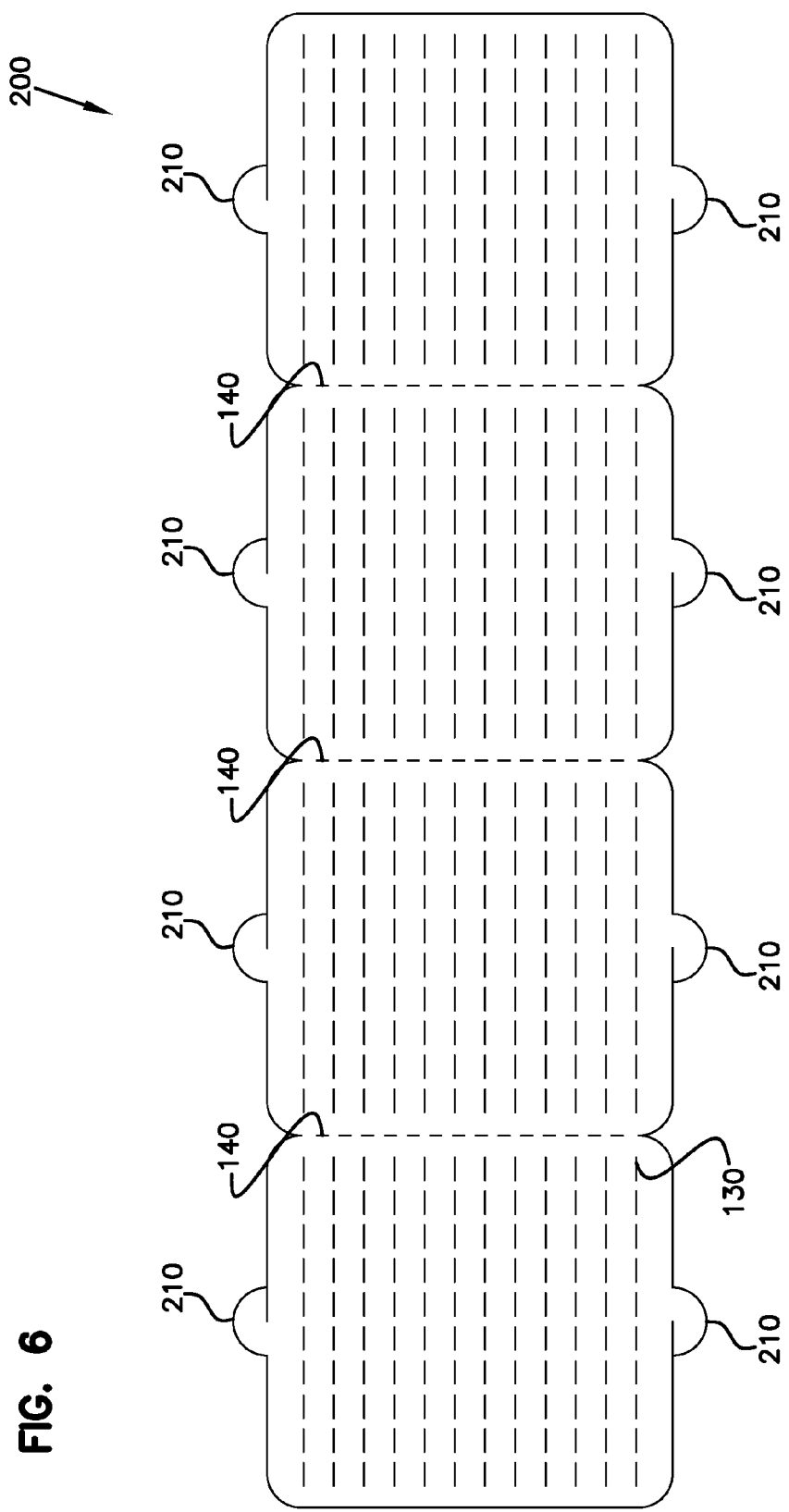
FIG. 6 is a front view of a the microwave packaging material as a group.

Referring now to FIG. 6, the microwave packaging material 200 is shown as being manufactured and supplied in groups. In singular configuration, the microwave package material 200 may warp which is unattractive to the consumer and can make the package material difficult to insert into a box. Therefore, the microwave packaging material 200 is generally provided in pairs of two or more and is folded over each other and spot glued together to minimize warping. In such embodiments, the microwave packaging material 200 includes a perforated edge 140 that connects to another microwave packaging material 200. One microwave packaging material 200 can be separated from another microwave packing material 200 by tearing along the perforated edge 140. In an embodiment, the perforated edge 140 includes perforations that are about 0.125 square inches. In embodiments, the size of each microwave packaging material 200 is about 4.106 inches to about 4.138 inches in width and the height of each microwave packaging material 200 is about 5.218 inches measured from the two opposing tabs 210.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

What is claimed is:

1. A microwave packaging material for increased browning and crisping comprising:
   a first susceptor layer, wherein the first susceptor layer includes a first plastic film, a first metal deposit, a first adhesive layer, and a first paper substrate, wherein the first metal deposit is supported on the first plastic film and the first paper substrate is joined to the first plastic film using the first adhesive layer;
   a second susceptor layer, wherein the second susceptor layer includes a second plastic film, a second metal deposit, a second adhesive layer, and a second paper substrate, wherein the second metal deposit is supported on the second plastic film and the second paper substrate is joined to the second plastic film using the second adhesive layer;
   a first pattern adhesive layer between the first susceptor layer and the second susceptor layer having the first paper substrate and the second paper substrate adjacent to one another;
   wherein the first pattern adhesive layer includes a plurality of sealed air pockets arranged and configured to inflate with exposure to microwave energy, and the sealed air pockets bulge away from the second susceptor layer to contact a surface of a food item;
   a second pattern adhesive layer; and
   a paper board, wherein the second pattern adhesive is used to bond the second susceptor layer to the paper board;
   the paper board comprising:
      a plurality of cuts to form flexibility in the paper board;
      a first tab and a second tab at opposing ends of one another;
      wherein the paperboard is arranged and configured to be rounded by connecting the first tab and the second tab together; and
      a plurality of perforations along an edge of the paper board constructed to attach other microwave packaging material to one another.

2. The microwave packaging material according to claim 1, wherein the food item is an egg roll.

3. The microwave packaging material according to claim 1, wherein the first pattern adhesive layer is between the first susceptor layer and the second susceptor layer opposing the first paper substrate and the second paper substrate.

4. The microwave packaging material according to claim 1, wherein the sealed air pockets are about ⅓ inch by about ¾ inch in size.

5. The microwave packaging material according to claim 1, wherein the sealed air pockets form bond lines that define an array of shapes.

6. The microwave packaging material according to claim 1, wherein the shape is circular, oval, symmetrical, triangular, square, rectangular, hexagon, or polygon.

7. The microwave packaging material according to claim 1, wherein the sealed air pockets are spaced between about ⅛ inch to about ½ inch from one another.

8. The microwave packaging material according to claim 1, wherein the second pattern adhesive layer is configured in a dot pattern.

* * * * *